United States Patent
Leibrock et al.

(10) Patent No.: US 10,303,330 B2
(45) Date of Patent: *May 28, 2019

(54) ENABLING DELAYED INTERACTIONS WITH CONTENT ITEMS PRESENTED BY A SOCIAL NETWORKING SYSTEM

(71) Applicant: Facebook, Inc., Menlo Park, CA (US)

(72) Inventors: Jane Leibrock, San Francisco, CA (US); Loren Alfred Cheng, Mountain View, CA (US); Matthew Brown, San Francisco, CA (US); Jessica Gronski, San Francisco, CA (US); Marc Horowitz, San Francisco, CA (US); William Jacobs, Mountain View, CA (US); Zhengzheng Pan, Fremont, CA (US); Xiao Ou Wang, San Francisco, CA (US); Joshua Van Dyke Watzman, Mountain View, CA (US); Luke Woods, San Francisco, CA (US); Rachel Margaret Wong, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 15/180,517

(22) Filed: Jun. 13, 2016

(65) Prior Publication Data
US 2016/0283067 A1 Sep. 29, 2016

Related U.S. Application Data

(63) Continuation of application No. 13/747,714, filed on Jan. 23, 2013, now Pat. No. 9,396,502.

(51) Int. Cl.
*G06F 17/00* (2019.01)
*G06F 7/00* (2006.01)
(Continued)

(52) U.S. Cl.
CPC .......... *G06F 3/0482* (2013.01); *G06F 3/0484* (2013.01); *G06Q 50/01* (2013.01); *H04L 67/02* (2013.01)

(58) Field of Classification Search
CPC . G06F 3/048; G06F 17/30; G06F 3/00; G06F 17/00; G06F 7/00; G06Q 30/00; G06Q 50/01; H04L 67/00
See application file for complete search history.

(56) References Cited

U.S. PATENT DOCUMENTS 8,060,634 B1 11/2011 Darnell et al.
8,631,068 B1 1/2014 Jannik et al.
(Continued)

OTHER PUBLICATIONS

United States Office Action, U.S. Appl. No. 13/747,714, dated May 20, 2015, twenty-three pages.
(Continued)

*Primary Examiner* — Hugo Molina
(74) *Attorney, Agent, or Firm* — Fenwick & West LLP

(57) ABSTRACT

When a user sees a content item presented by a social networking system, the user may select an option to save the content item. The saved content item may be reinserted in a newsfeed presented to the user, integrated into collections, archived, used for notifications to the user, or otherwise subsequently presented to the user. A plug-in may be used to save content items accessed through websites external to the social networking system. As privacy settings associated with a saved content item are modified, the modified privacy settings are applied to the saved content item, which may prevent the user saving the content item from subsequently viewing the saved content item.

11 Claims, 3 Drawing Sheets

(51) Int. Cl.
*G06F 3/048* (2013.01)
*G06F 3/0482* (2013.01)
*G06Q 50/00* (2012.01)
*G06F 3/0484* (2013.01)
*H04L 29/08* (2006.01)

(56) References Cited

U.S. PATENT DOCUMENTS

| | | | |
|---|---|---|---|
| 8,874,559 | B1 | 10/2014 | Karimzadehgan et al. |
| 9,298,786 | B1 | 3/2016 | Wang et al. |
| 9,471,671 | B1 | 10/2016 | Juang et al. |
| 9,648,056 | B1 * | 5/2017 | Kim .................. G06Q 30/0235 |
| 2008/0040673 | A1 | 2/2008 | Zuckerberg et al. |
| 2008/0248815 | A1 * | 10/2008 | Busch .............. H04W 4/029 455/456.5 |
| 2009/0248833 | A1 | 10/2009 | Frazier |
| 2010/0088170 | A1 | 4/2010 | Glore, Jr. |
| 2010/0138416 | A1 * | 6/2010 | Bellotti ............... G06F 16/4393 707/736 |
| 2011/0055177 | A1 * | 3/2011 | Chakra ............ G06F 17/30165 707/695 |
| 2011/0153412 | A1 | 6/2011 | Novikov et al. |
| 2011/0264736 | A1 | 10/2011 | Zuckerberg et al. |
| 2012/0084122 | A1 * | 4/2012 | Boehle ............... G06Q 30/0207 705/14.1 |
| 2012/0095979 | A1 * | 4/2012 | Aftab ................ G06F 17/30867 707/706 |
| 2012/0159635 | A1 | 6/2012 | He et al. |
| 2012/0166432 | A1 | 6/2012 | Tseng |
| 2012/0173626 | A1 | 7/2012 | Reis et al. |
| 2012/0185447 | A1 | 7/2012 | Zhang et al. |
| 2012/0221559 | A1 | 8/2012 | Kidron |
| 2013/0013418 | A1 | 1/2013 | Novikov et al. |
| 2013/0031487 | A1 | 1/2013 | Olsen et al. |
| 2013/0124539 | A1 | 5/2013 | Lin et al. |
| 2013/0151610 | A1 * | 6/2013 | Schoen .................. G06Q 50/01 709/204 |
| 2013/0204706 | A1 * | 8/2013 | Tang ..................... G06Q 30/02 705/14.58 |
| 2013/0268889 | A1 | 10/2013 | Barak et al. |
| 2013/0290339 | A1 | 10/2013 | LuVogt et al. |
| 2013/0302005 | A1 | 11/2013 | Harwell et al. |
| 2013/0304822 | A1 * | 11/2013 | Tetreault ............ H04N 21/2187 709/204 |
| 2014/0344288 | A1 | 11/2014 | Evans et al. |

OTHER PUBLICATIONS

United States Office Action, U.S. Appl. No. 13/747,714, dated Nov. 6, 2014, twenty-three pages.

* cited by examiner

ENABLING DELAYED INTERACTIONS WITH CONTENT ITEMS PRESENTED BY A SOCIAL NETWORKING SYSTEM

CROSS-REFERENCE TO RELATED APPLICATIONS

This a continuation of U.S. patent application Ser. No. 13/747,714, filed Jan. 23, 2013, which is hereby incorporated by reference in its entirety.

BACKGROUND

This invention relates generally to interacting with content via a social networking system, and more particularly, to encouraging users to interact with previously presented content stored by a social networking system user.

Social networking systems present large amounts of content to their users. Examples of content presented by a social networking system include status updates, descriptions of actions performed by social networking system users, audio and video posts, new associations, advertisements, offers, activities, and other types of content. As social networking systems have an increasing number of users, there is an increasing amount of content for presentation to social networking system users, making it difficult for a user to review or interact with the amount of content presented by the social networking system. For example, when a user sees interesting content, the user be unable interact with the content when it is initially viewed (e.g., viewing a link at work to a video that the user wants to view at home) or may desire to view future updates to presented content item.

However, social networking systems frequently present content to users as a chronologically organized newsfeed. Typically, a social networking system presents a user with the most recent content item at the top of a page including the newsfeed and presents older content item at lower locations of the page. Thus, to interact with content previously presented by the social networking system, a user typically navigates through newly-presented content. As an increasing amount of new content is received, it becomes more difficult to navigate through the new content to identify a desired previously-presented content item, making it difficult for users to subsequently interact with previously-presented content.

SUMMARY

Users of social networking system may save a content item presented by the social networking system, allowing the users to more easily retrieve the content item from the social networking system. When the social networking system prevents a content item to a user, an input option is presented, and accessing the input option allows the user to save the content item to the social networking for subsequent interaction. The social networking system presents a saved content item to the user at a later time, allowing the user to more easily retrieve and interact with the saved content item after its initial presentation. Saved content items may be presented to the user via any suitable channels. Examples of channels for presenting a saved content item include sending a notification of the saved content item to the user, including the saved content item into a newsfeed at a later time, maintaining a page of the social networking system including saved content items, or any other suitable communication channel.

A content item saved by a user may be presented to the user based on information about the user or about the saved content item. For example, if the social networking system receives location information associated with the user that is within a threshold distance of a location associated with the saved content item, the social networking system includes the saved content item in the user's newsfeed at a more recent time or otherwise presents the saved content item to the user. As another example, the user is presented with a saved content item based on the amount of time between a current time and the user's most recent interaction with the social networking system or based on an expected amount of interaction between the user and the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
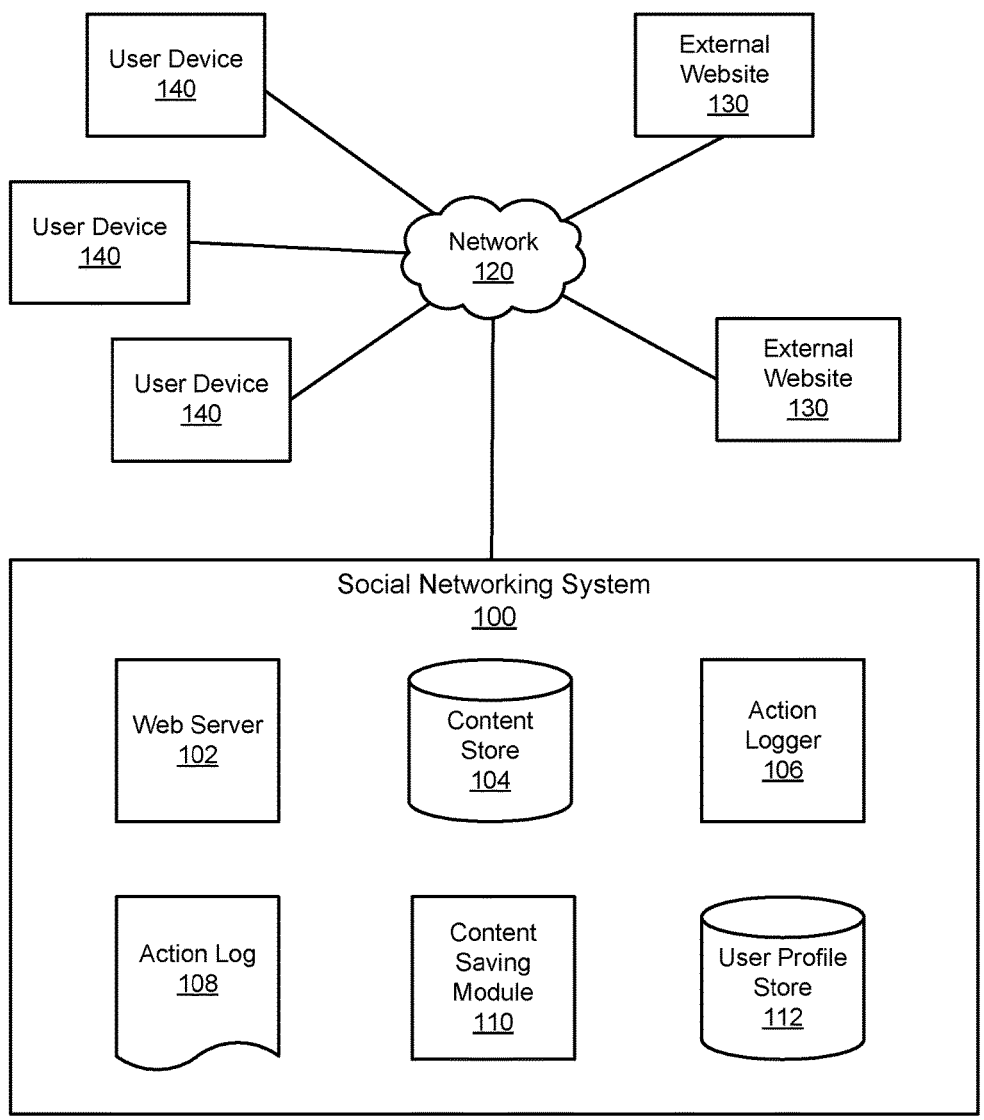
FIG. 1 is a block diagram of a system environment including a social networking system, according to one embodiment.

FIG. 1 is a block diagram of one embodiment of a system environment including a social networking system 100. The system environment shown by FIG. 1 includes one or more user devices 140, one or more external websites 130, a network 120, and the social networking system 120. In other embodiments, the system environment includes different and/or additional components than those shown by FIG. 1.

The social networking system 100 receives content items from users and allows users to establish connections to other users. Content items received from users are presented to other users via the social networking system 100, such as users connected to a user from which the content item was received. The social networking system 100 exchanges data with one or more user devices 140 and one or more user devices 140 through the network 120. FIG. 1 shows one embodiment of a social networking system 100 including a web server 102, a content store 104, an action logger 106, an action log 108, a content saving module 110, and a user profile store 112. However, in other embodiments the social networking system 100 may include different and/or additional components than those shown in FIG. 1.

The web server 102 exchanges data between the social networking system 100 and one or more user devices 104 and/or one or more external websites 130. For example, the web server 102 receives requests from the user devices 140 and provides interfaces and content items to the user devices 140. Content items provided by the web server 102 may be selected by the social networking system 100 based on information associated with a user requesting the content items by the social networking system 100. This increases the likelihood of the user interacting with the provided content items. In one embodiment, the web server 102 provides a newsfeed to the user device 140 requesting the content items. The newsfeed presents the content items or stories describing the content items in a chronological order.

In one embodiment, the newsfeed provided to the user device 140 includes one or more inputs allowing a user to save one or more of the presented content items via the social networking system 100. For example, an input is included in each story including a content item, allowing the user to access the input to save the story or the content item described by the story. As further described below, when a user stores a presented item via the social networking system 100, the social networking system 100 subsequently retrieves the saved content item for presentation to the user at a later time.

The web server 102 may also exchange data with one or more external websites 130. For example, a social plug-in included on pages provided by an external website 130 exchanges data with the web server 102, allowing the external website 130 to include information from the social networking system 100 along with the content from the external website 130 on the pages. Hence, a social-plug in presented on a page from an external website 130 may allow a user to save the page to the social networking system 100 as if the user were saving content presented via the social networking system 100.

The content store 104 stores objects representing various types of content items for presentation by the social networking system 100. Examples of content items represented by objects include a page post, a status update, a photo, a video, a link, a shared content item, a gaming application achievement, a check-in event at a local business, a brand page, or any other type of content. Objects may be created by users of the social networking system 100, such as status updates, photos, events, groups or applications; users may restrict or grant access to content items. In some embodiments, content items stored as objects are received from third-party applications, which may be separate from the social networking system 100. As used herein, a "content item" represents a single piece of content presented to social networking system users. Presenting content items to users increases user interaction with the social networking system 106 by encouraging users to post content items for presentation, increasing the interaction of users with each other and increasing the frequency with which users interact within the social networking system 100.

The action logger 106 receives communications about user actions on and/or off the social networking system 100 and populates the action log 108 with information describing these actions. Examples of actions include adding a connection to another user, sending a message to another user, uploading an image, reading a message from another user, viewing content associated with another user, attending an event posted by another user, among others. The social networking system 100 uses the action logger 106 and the action log 108 to track user actions on the social networking system 100, as well as on external websites that communicate information to the social networking system 100.

Users may interact with various objects on the social networking system 100, including commenting on posts, sharing links, and checking-in to physical locations via a mobile device, accessing content items or other interactions. Information describing these actions is captured by the action logger 106 and stored in the action log 108. Additional examples of interactions with objects on the social networking system 100 included in the action log 108 include commenting on a photo album, communications between users, becoming a fan of a musician, adding an event to a calendar, joining a group, becoming a fan of a brand page, creating an event, authorizing an application, using an application and engaging in a transaction. Additionally, the action log 108 records a user's interactions with advertisements on the social networking system 100 as well as other applications operating on the social networking system 100. In some embodiments, data from the action log 108 is used to infer interests or preferences of the user, augmenting the interests included in a user profile associated with the user and allowing a more complete understanding of user preferences.

The action log 108 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, external websites 130, such as this sporting equipment retailer, may use the information about social networking system users accessing content from an external website 130. The action log 108 records data about these users, including webpage viewing histories, advertisements that were engaged, purchases made, and other patterns from shopping and buying.

Each user of the social networking system 100 is associated with a user profile, which is stored in the user profile store 112. A user profile includes declarative information about the user that was explicitly provided by the user, and may also include information inferred by the social networking system 100. In one embodiment, a user profile includes multiple data fields, with each data field describing one or more attributes of the corresponding user of the social networking system 100. Examples of information stored in a user profile includes biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 112 may also maintain references to actions by the corresponding user performed on content items in the content store 104 and stored in the action log 108 and references to connections to other users.

While user profiles in the user profile store 112 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system 100 using a brand page associated with the entity's user profile. Other users of the social networking system 100 may connect to the brand page to receive information posted to the brand page or to receive information from the brand page. A user profile associated with the brand page may include information about the entity itself, providing users with background or informational data about the entity associated with the brand page.

A user profile may also store a user profile list that defines a list of other user profiles. The user profile list can be created and updated by the user or automatically created and updated by the social networking system 100. For example, a user creates and updates a list of user profiles belonging to the user's close friends, family members, or co-workers. In another example, the social networking system 100 automatically creates and updates a list of users that attended the same university as the user. A user profile list may be used to identify content items associated with users on the user profile list for presentation to the user, allows the user to more easily interact with the users on the user profile list.

The content saving module 110 receives a request from a user to save a content item presented to the user by the social networking system 100. When a request to save a content item is received, the content saving module 110 includes data in the content store 104 indicating a user identifier of the user saving the content item. The content saving module 110 also identifies and stores the state of the content item when the request to save the content item was received. For example, a content item having 3 comments when a request to save it is received is saved in a state having 3 comments; hence, if additional comments are associated with the content item after it is saved, the saved content idem does not identify the additional comments. The additional comments may be identified by the content saving module 110 to differentiate between comments presented when the request to save the content item was received and comments provided after the content item was saved.

The content saving module 110 may store data describing the state of a saved content item or may include a reference to data in the content store 104 describing the saved content item and data describing the state of the saved content item when the request to save the content item was received. Based on information about the user providing the request to save the content item, the content saving module 110 retrieves and presents the saved content item to the user providing the request to save the content item. After a content item is saved, user interactions with the content item via the social networking system 100 may affect the state of the saved content item.

Saving a content item via the content saving module 110 allows a user to more easily interact with the saved content item by simplifying access to the saved content item. To encourage user interaction with the saved content item, the content saving module 110 may again present the saved content item to the user based on information associated with the user that saved the content item. For example, based on the time of day, the length of time a user interacts with the social networking system 100, location data associated with the user, the number of items the user has saved, or any other suitable information, the content saving module 110 may retrieve and present a saved content item to the user.

For example, the content saving module 110 retrieves a content item saved by a user if the user interacts with the social networking system 100 for at least a threshold amount of time, which may indicate that the user has sufficient time to review the saved content item as well as newly presented content items. In some embodiments, a saved content item may be retrieved based on time of day; for example, based on historical interactions with the social networking system 100, a user may interact with the social networking system 100 for a longer amount of time after a specified time of day, so a saved content item is retrieved and presented to the user after the specified time of day. In some embodiments, the content saving module 110 uses a behavioral model to determine user behavior and estimated length of the user's interactions with the social networking system 100 based on past activity and log-in times. If the behavioral model determines at least a threshold likelihood that the user will interact with the social networking system 100 for at least a threshold amount of time, a saved content item is retrieved and presented by the content saving module 110. Additionally, the length of time a saved content has been saved may also be used when retrieving and presenting a saved content item to the user that saved the content item.

Additionally, location information associated with a user may be used to retrieve and present saved content items to the user. In one embodiment, if the user is within a threshold distance of a location associated with a content item saved by the user, the saved content item is presented to the user. For example, a user saves an advertisement or offer from a retailer and when location information associated with the user is within a threshold distance of a location associated with the retailer, the saved advertisement is retrieved and presented to the user. A user device 140 may communicate location information to the social networking system 100 that may be associated with a user using the user device 140, subject to user privacy settings, and the content saving module 110 determines if the location information is within a threshold distance of a location associated with the saved content item. For example, a saved content item associated with a retailer is presented to the user if the user check-ins to a store operated by a retailer associated with a saved content item or another location near a store operated by the retailer. This allows the content saving module 110 provide a user with saved content pertinent to the user's location.

Saved content items may also be retrieved and presented to a user based on the user's interactions with external websites 130. For example, a user saving an offer from online retailer may visit an external website 130 associated with the online retailer that operates a social-plug in exchanging information with the social networking system 100. The social-plug in communicates information identifying the user and the user's interaction with the external website 130 to the social networking system 100, and the content saving module 110 may identify saved content items associated with the user and with the external website 130 based on the information. A saved content item identified by the content saving module 110 is communicated to the social plug-in operated by the external website 130 for presentation to the user along with content from the external website 130. In this example, the saved offer is presented to the user via the social plug-in while viewing content from the external website 130 to encourage the user to take advantage of the offer while accessing the external website 130.

User interactions with a content item may cause presentation of a saved content item to a user. After a user saves a content item, the content item is presented to additional users that may interact with the content item. These interactions may be identified by the content saving module 110, causing retrieval and presentation of the saved content item to the user. For example, if a specified user comments on the content item, if a threshold number of users comment on the content item, if a threshold number of users express a preference for the saved content item ("like" the content item), or any other suitable interaction is performed, the saved content item is retrieved and presented to the user by the content saving module 110. In one embodiment, the saved content item and a description of the interactions with the content item after it was saved are presented. Additionally, the number of content items saved by a user may be used to identify saved content items for presentation to the user; for example, if a threshold number of content items are saved, one or more saved content items may be selected for presentation to the user.

Saved content items may be subject to privacy settings specified by a user owning or otherwise administering the content items. A user may modify the privacy settings of a saved content item so that the saved content item is no longer accessible to the user that saved the saved content item. While the change in privacy settings prevents the saving user from being presented with the saved content item, the content saving module 110 may maintain an indication that content item is saved by the user. Hence, if the privacy settings of the saved content item modified are again modified to allow access to the user saving the content item, the saved content item may be presented to the user.

A saved content item may be presented to a user in a variety of ways. For example, the saved content item is presented by a notification to the user identifying the saved content item. Alternatively, the saved content item is inserted into the user's newsfeed at a more recent time, making it more accessible, or is presented using any suitable distribution channel. One or more saved content items may be accessible through a page dedicated to presenting the saved content items. The page may chronologically present content items saved by a user. In one embodiment, a user may identify specific types (e.g., videos, photos, status messages, etc.), so the page presents saved content items having the identified types. Content items saved by a user may also be added to categories, which may be accessed via the page.

As described above, other users may interact with a content item after the content item was saved by the user. For example, other users presented with the content item may comment on the content item, express a preference for the content item, share the content item with additional users, or perform any other interaction with the content item. Hence, the content saving module 110 may present a saved content item to a user based on the state of the saved content item when it was saved or may present the saved content item modified to include interactions between other users and the content item after it was saved. In one embodiment, interactions with the saved content after it was saved are visually distinguished from the state of the saved content item when it was saved.

The user devices 140 comprise one or more computing devices capable of receiving user input as well as transmitting and/or receiving data via the network 120. In one embodiment, the user device 140 is a conventional computer system, such as a desktop or laptop computer. Alternatively, a user device 140 may be a device having computer functionality, such as a personal digital assistant (PDA), mobile telephone, smart-phone, or similar device. The user device 140 is configured to communicate via the network 120. In one embodiment, a user device 140 executes an application allowing a user of the user device 140 to interact with the social networking system 100. For example, a user device 140 executes a browser application to exchange information between the user device 140 and the social networking system 100 via the network 120. In another embodiment, a user device 140 interacts with the social networking system 100 through an application programming interface (API) that runs on the native operating system of the user device 140, such as IOS® or ANDROID™.

Information is communicated between the user devices 140, the social networking system 100 and/or the one or more external website 130 via the network 120, which may comprise any combination of local area and/or wide area networks, using both wired and wireless communication systems. In one embodiment, the network 120 uses standard communications technologies and/or protocols. Thus, the network 120 may include communication links using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of the communication links may be encrypted using conventional encryption technologies such as secure sockets layer (SSL), transport layer security (TLS), and Internet Protocol security (IPsec).

User Interface

Figure 2:
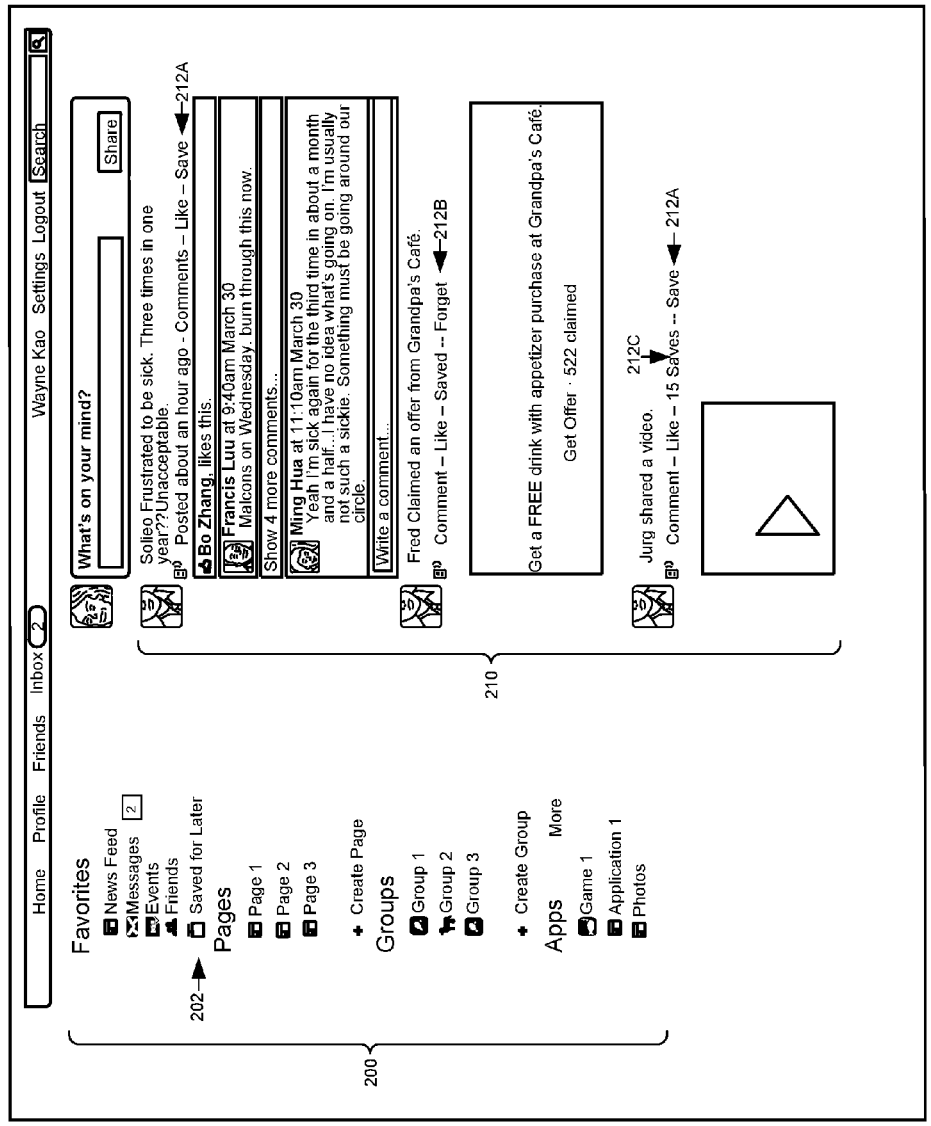
FIG. 2 is an example interface for saving content items presented by a social networking system, according to one embodiment.

FIG. 2 illustrates an example interface for social networking system users interacting with saved content items. The interface shown by FIG. 2 includes a selection region 200 and social content 210. The selection region 200 allows a user to retrieve various content items maintained by the social networking system 100. For example, the selection region 200 identifies different types of content items, and selecting a portion of the selection region 200 presents content having the type corresponding to the selected portion is presented in the social content 210. The selection region 200 includes an option for accessing saved content, identified as a saved for later option 202 in FIG. 2. If the saved for later option 202 is selected, the content saving module 110 retrieves content items saved by the user.

The social content 210 retrieved from the content store 104 and communicated to a user device 140, along with instructions for generating the interface, by the web server 102. Various inputs for receiving input from a user to interact with the social content 210 are included in the interface. For example, inputs allow a user to comment on a content item shown in the social content 210, express a preference for a content item shown in the social content 210, or otherwise interact with content items shown in the social content 210. A save input 212A allows a user to select a content item to be saved by the content saving module 110. In one embodiment, an indication 212B that a content item has previously been saved is presented in place of the save input 212A. In some embodiments, the save input 212A includes additional information 212C. For example, the additional information 212C may identify the conditions used to determine when to present the saved content item to the user. As another example, the additional information 212C may identify the number of times the content item has been saved by other users or has been saved by other users connected to the user viewing the social content 212.

Presentation of Content Items Saved by a Social Networking System User

Figure 3:
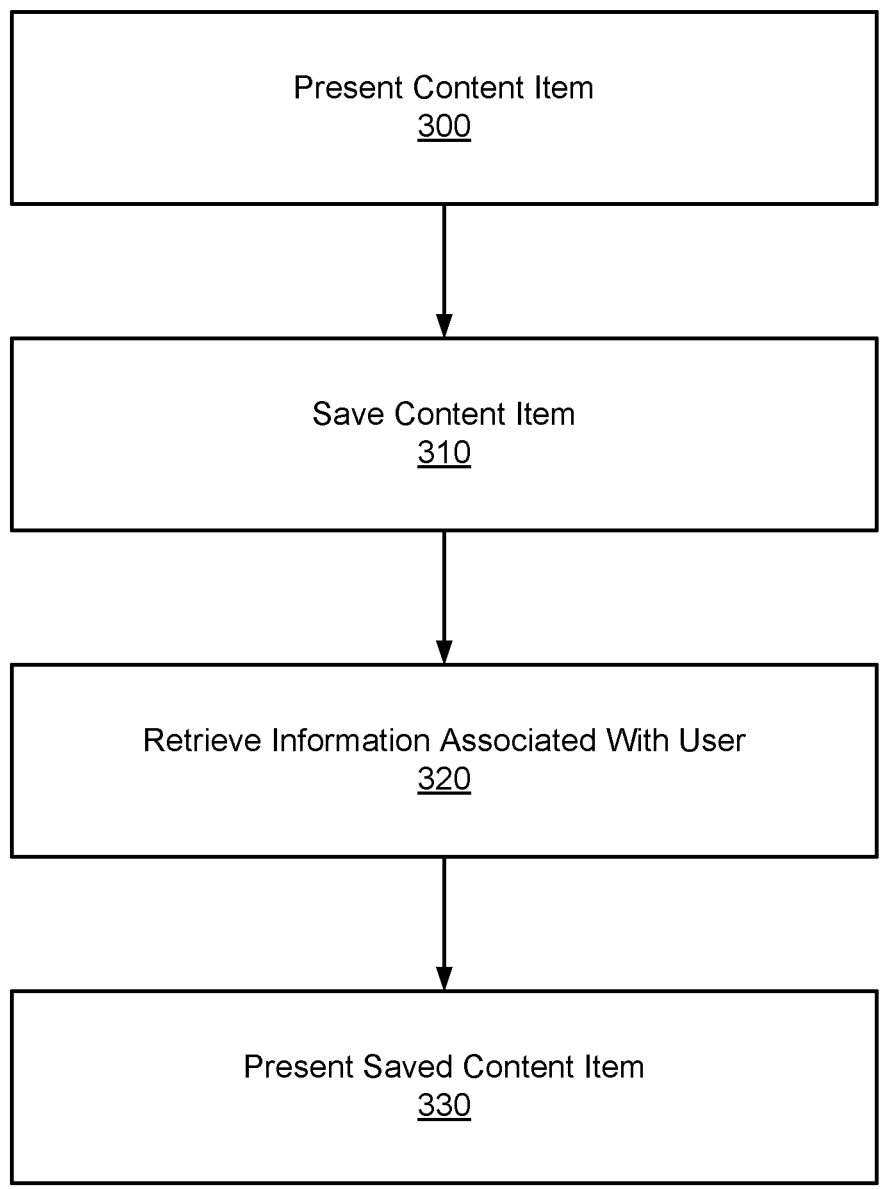
FIG. 3 is a flow chart for a method of providing saved content items, according to one embodiment.

FIG. 3 is a flow chart for a method providing saved content items, according to one embodiment. In one embodiment, the method illustrated in FIG. 3 is performed through content saving module 110, although in other embodiments, the method may be performed by any component or combination of components of the social networking system 100. One or more content items are presented 300 to the user by the social networking system 100. The user identifies a content item to save and communicates an identification of the content item to the social networking system 110, which saves 310 the identified content item. In one embodiment, the state of the content item is saved 310, allowing identification of changes to the content item after it was saved 310.

Subsequently, the content saving module 110 retrieves information 320 about the user that saved the content item. Based on the retrieved information, the content saving module 110 presents 330 the saved content item to the user at a time after it was saved. As described above in conjunction with FIG. 1, various types of information associated with the user may be retrieved and used to determine when to present 330 the saved content item to the user. For example, the retrieved information is an action from the user requesting to view a page including saved content items. As another example, the retrieved information is location information associated with the user, which is compared to location information associated with the saved content item, as described above in conjunction with FIG. 1. The saved content item may be presented 330 to the user in a variety of ways. For example, the saved content item may be inserted into a newsfeed presented to the user in a location associated with a more recent time or may be presented 330 using a notification sent to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
sending, one or more content items, each associated with a time, for presentation to a user of a social networking system in a newsfeed comprising a chronological list of the content items based on the times associated with the content items;
receiving, by a processor, a selection of a content item from the one or more content items presented in the newsfeed of the social networking system;
saving, by the processor, the selected content item and a description of a saved state of the content item in response to the received selection of the content item;
retrieving, by the processor, information associated with the user of the social networking system;
automatically determining, by the processor, that the retrieved information associated with the user of the social networking system satisfies one or more criteria for presenting the content item at an additional time after the content item is saved;
responsive to the retrieved information associated with the user of the social networking system satisfying one or more criteria for presenting the content item at the additional time:
determining, by the processor, modifications between the description of the saved state of the content item and a description of a current state of the content item being available for presentation to other users in the newsfeeds of the social networking system;
sending, by the processor, the content item and the determined modifications for presentation to the user in the newsfeed of the social networking system; and
presenting the content item having the description of the saved state of the content item and the determined modifications, the determined modifications visually distinguished from the description of the saved state of the content item in the presentation, the presentation of the content item subject to one or more privacy settings associated with the content item by an additional user, wherein the one or more privacy settings are determined when the content item is to be presented in a newsfeed of the social networking system at the additional time.

2. The computer-implemented method of claim 1, wherein presenting the content item at the additional time comprises:
receiving one or more user interactions with at least one of the social networking system and an external website, the user interactions comprising at least one of a group including comments of posts, sharing links and checking-in to physical locations via a mobile device; and presenting the content item in the newsfeed based in part on the received one or more user interactions.

3. The computer-implemented method of claim 1, wherein presenting the content item at the additional time comprises: transmitting a notification including the content item to the user.

4. The computer-implemented method of claim 1, wherein the retrieved information associated with the user of the social networking system satisfying one or more criteria comprises: determining a current time is greater than a threshold time from a time when the content item was saved.

5. The computer-implemented method of claim 1, wherein the retrieved information associated with the user of the social networking system satisfying one or more criteria includes one or more actions associated with the user.

6. The computer-implemented method of claim 1, wherein the retrieved information associated with the user of the social networking system satisfying one or more criteria comprises: determining at least a threshold number of saved content items are associated with the user.

7. The computer-implemented method of claim 1, wherein the retrieved information associated with the user of the social networking system satisfying one or more criteria comprises: determining a time to present the user with the saved content item based on one or more user actions.

8. The computer-implemented method of claim 1, wherein the retrieved information associated with the user of the social networking system satisfying one or more criteria comprises: determining a type of interaction with the content item was received from another user connected to the user.

9. A computer-implemented method comprising:
   sending one or more content items for presentation to a user of a social networking system in a newsfeed comprising a list of the content items;
   receiving, by a processor, a selection of a content item from the one or more content items presented in the newsfeed of the social networking system;
   saving, by the processor, the content item and a description of a state of the content item in response to the received selection of the content item;
   retrieving, by the processor, location information associated with the user of the social networking system;
   determining a time to present the user with the content item for an additional time based on one or more user actions;
   responsive to determining the retrieved location information associated with the user of the social networking system is within a threshold distance of a location associated with the content item for presenting the content item at the additional time;
   determining, by the processor, modifications between the description of the saved state of the content item and a description of a current state of the content item being available for presentation to other users in the newsfeeds of the social networking system;
   sending, by the processor, the content item and the determined modifications for presentation to the user in the newsfeed of the social networking system; and
   presenting the content item having the description of the saved state of the content item and the determined modifications, the determined modifications visually distinguished from the description of the saved state of the content item in the presentation, the presentation of the content item subject to one or more privacy settings associated with the content item by an additional user, wherein the one or more privacy settings are determined when the content item is to be presented in a newsfeed of the social networking system at the additional time.

10. The computer-implemented method of claim 9, wherein presenting the content item at the additional time comprises:
    receiving one or more user interactions with at least one of the social networking system and an external website, receiving one or more user interactions with at least one of the social networking system and an external website, the user interactions comprising at least one of a group including comments of posts, sharing links and checking-in to physical locations via a mobile device; and
    presenting the content item in the newsfeed based in part on the received user interaction.

11. The computer-implemented method of claim 9, wherein presenting the content item at the additional time comprises: transmitting a notification including the content item to the user.

* * * * *